Oct. 9, 1956
C. H. PESCHKE
2,766,125
PROCESS OF PREPARING A PACKAGED SAUSAGE PRODUCT
Filed May 13, 1950
2 Sheets-Sheet 1
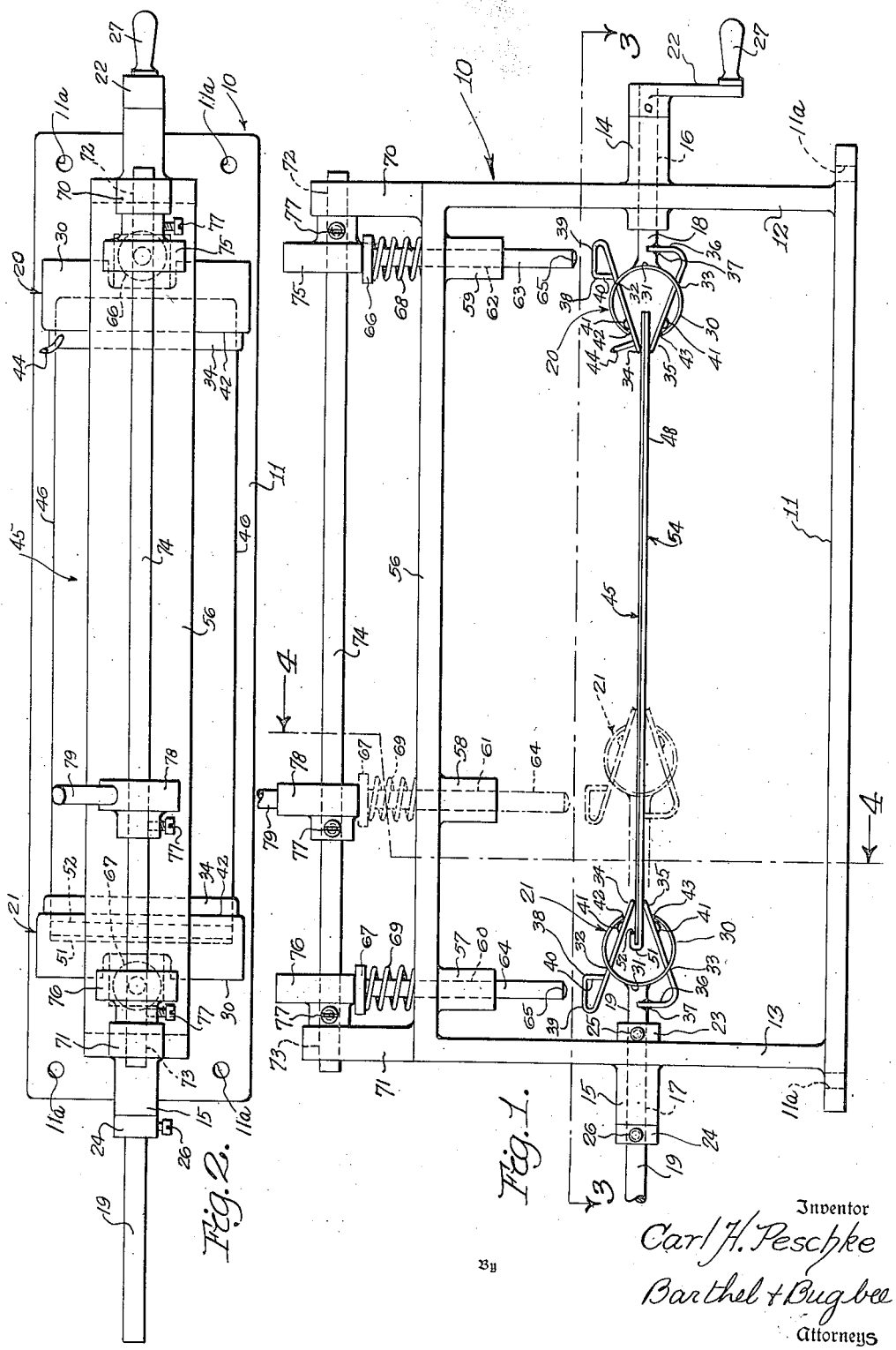
Inventor
Carl H. Peschke
Barthel + Bugbee
Attorneys Oct. 9, 1956     C. H. PESCHKE     2,766,125
PROCESS OF PREPARING A PACKAGED SAUSAGE PRODUCT
Filed May 13, 1950     2 Sheets-Sheet 2
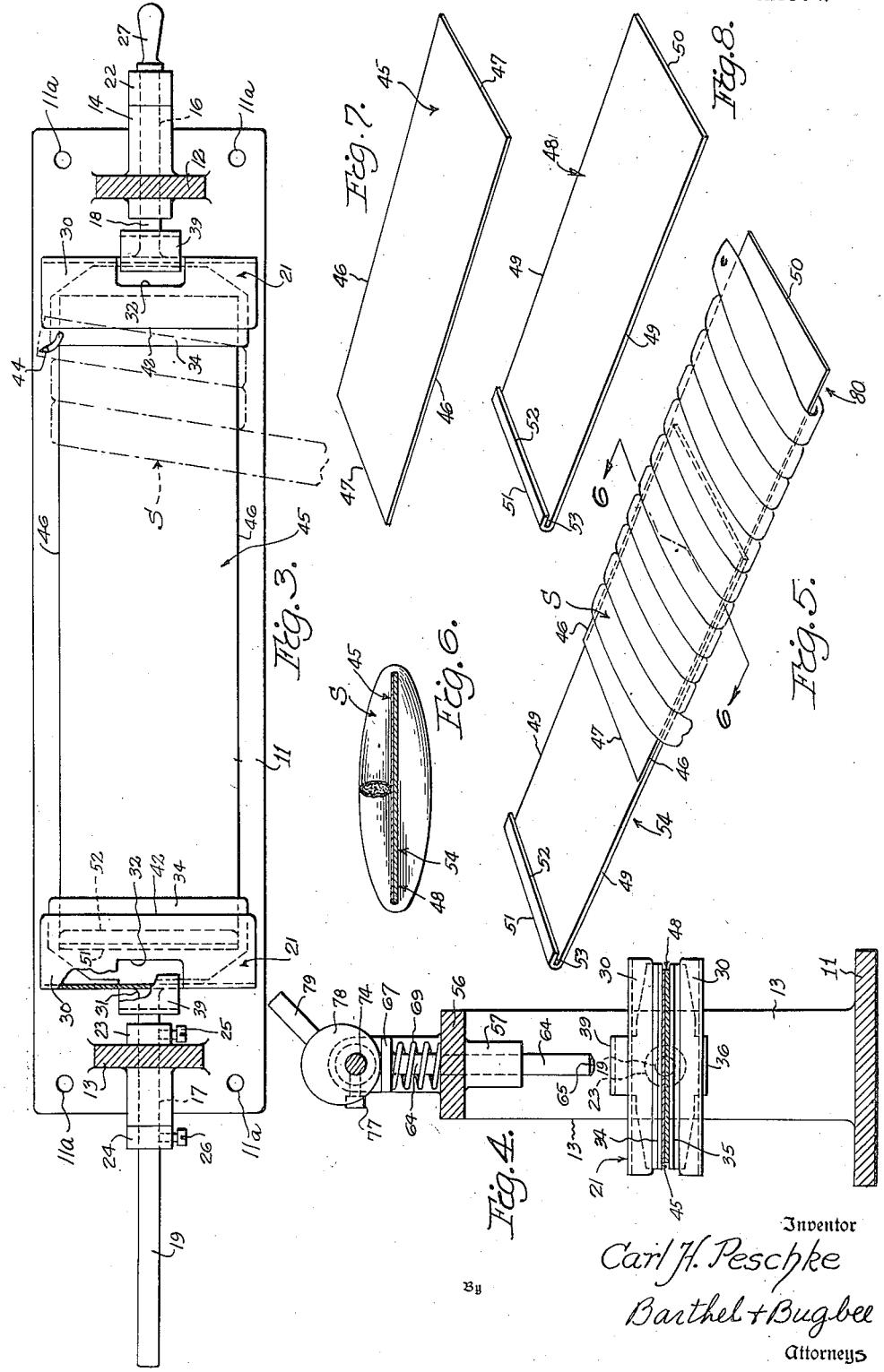
Inventor
Carl H. Peschke
Barthel + Bugbee
Attorneys

United States Patent Office 2,766,125
Patented Oct. 9, 1956

2,766,125

PROCESS OF PREPARING A PACKAGED SAUSAGE PRODUCT

Carl Henry Peschke, Detroit, Mich.

Application May 13, 1950, Serial No. 161,877

5 Claims. (Cl. 99—174)

This invention relates to food articles, machines and processes and, in particular, to food products in the form of food-filled tubular membranes, such as sausages, sausage machines and processes of making sausages.

One object of this invention is to provide a food product in the form of a food-filled tubular membrane such as a greatly elongated sausage which is wound upon a card or other plate-like support in such a manner as to be kinked automatically by the opposite edges of the card, without the need for tying or kinking as is ordinarily carried out, the sausage thus mounted on the card being sold in that form in predetermined weights and used by unwinding the required lengths and cutting them off before cooking.

Another object is to provide a machine for winding such elongated kinkless food products on a plate-like support, such as a card, and supporting the card during winding.

Another object is to provide a machine of the foregoing character wherein the card is mounted on a relatively stiff support of sheet metal or the like and held by releasable clamps or clips while the food product is being wound upon both the card and the support, after which the support is withdrawn, leaving the food product wound upon the card and kinked automatically at intervals by the opposite edges of the card.

Another object is to provide a machine of the foregoing character having clamped releasing mechanism which, when operated, causes the clamps or clips to relax their grip on the card and support so that the assembly thereof may be removed from the machine and another assembly of a card and support inserted in the machine so as to wind another length of food product thereon.

Another object is to provide a process of preparing a packaged tubular food product consisting of winding a length of unkinked food-filled tubular membrane tightly upon a plate-like member, such as a card, so as to flatten the convolutions of the food product against the sides of the card and cause the edges of the card to indent the food product at intervals corresponding to the width of the card, thereby automatically kinking the food product, which is severed when the required weight of sausage has been mounted on the card in this manner.

Another object is to provide a process of preparing a packaged food product as set forth in the object immediately preceding, the process including the steps of mounting the card on a stiffening member or support, winding the food-filled tubular membrane on the combined assembly of card and support, and then removing the support, such as by sliding it outward lengthwise of the card, leaving the food-filled membrane wound in flat and indented or kinked convolutions on the card.

In the drawings:

Figure 1 is a side elevation of a food packaging machine according to one form of the invention and constituting one means of carrying out the process of the invention;

Figure 2 is a top plan view of the food packaging machine of Figure 1;

Figure 3 is a horizontal section taken along the line 3—3 in Figure 1, showing in dotted lines a length of food-filled tubular membrane partially wound into packaged form;

Figure 4 is a vertical section taken along the line 4—4 in Figure 1;

Figure 5 is a perspective view of a packaged food product after its removal from the packaging machine with the support or form partially withdrawn therefrom and before the wrapper is applied thereto;

Figure 6 is a cross-section taken along the line 6—6 in Figure 5;

Figure 7 is a perspective view of the card on which the food-filled membrane is wound; and Figure 8 is a perspective view of a form or support upon which the card of Figure 7 is mounted while the food-filled membrane is being wound thereon.

Referring to the drawings in detail, Figure 1 shows a food-packaging machine, generally designated 10, as including a base 11 having holes 11a through which fasteners may be inserted to anchor the machine to a bench or other firm support. Rising from the opposite ends of the base 11 are forward and rearward uprights 12 and 13 provided with bosses 14 and 15 which are bored as at 16 and 17 respectively to receive coaxial shafts 18 and 19 carrying clamps or clips, generally designated 20 and 21 respectively. Pinned or otherwise secured to the shaft 18 is a hand crank 22 by which the shaft 18 and its clamp or clip 20 may be rotated. Mounted on the shaft 19 on opposite sides of the boss 15 are retaining collars 23 and 24 having set screws 25 and 26 for adjustably securing them to the shaft 19. The crank 22 is provided with a handle 27.

The two clips or clamps 20 and 21 are similar to one another in substantially all respects except one, hence a single description and the same reference numerals will suffice for both. Each consists of a partially tubular spring metal member 30 which is secured as at 31 to the end of the shaft 18 or 19 as the case may be, the member 30 being slotted as at 32 and 33 for the passage of upper and lower jaws 34 and 35. The lower jaw 35 has a bent portion 36 and is welded or otherwise secured as at 37 to the shaft 19. The jaw 34, on the other hand, is provided with a loop portion 38 formed by bending the outer end thereof so as to provide a contact portion 39 and a strengthening portion or brace 40 extending from the contact portion to the jaw 34 itself. Each of the jaws 34 and 35 is provided with a projection or protuberance 41 which prevents the jaw from slipping past the edge 42 or 43 of the member 30. The member 30 is almost, but not quite, of tubular form, having an opening between the edges 42 and 43.

The jaw 34 of the clip or clamp 20 is additionally provided with a hook or pin 44 which is secured thereto by welding or other suitable means and which serves as a temporary anchorage for one end of the food-filled tubular membrane while it is being wound upon the card 45. The card 45 is of cardboard or other suitable material of sheet-like or plate-like form with the necessary stiffness and is of elongated shape with opposite side edges 46 and opposite end edges 47 (Figure 7). While the sausage S is being wound upon the card 45, the latter is reinforced by a form or support, generally designated 48, having opposite side edges 49, a smooth end edge 50 and a bent-over edge 51 having an overhanging portion 52 providing a groove 53 into which one end 47 of the card 45 fits, forming an assembly, generally designated 54.

Extending between the upper portions of the uprights 12 and 13 is a cross bar or platform 56 having depending bosses 57, 58 and 59 provided with bores 60, 61 and 62 respectively. The bosses 57 and 59 are located at a separation from one another corresponding to the separations of the contact portions 39 of the clips or clamps 20 and 21 when a given length of sausage S is wound upon a card 45 of the correct length for the amount of sausage to be packaged in that particular weight, and their bores 60 and 62 are aligned with these contact portions 39. Reciprocably mounted in the bores 60 and 62 are push rods 63 and 64, the lower ends 65 of which are preferably rounded to conveniently engage the contact portions 39 of the clips 20 and 21. The upper ends of the push rods 63 and 64 carry heads 66 and 67 forming abutments for helical springs 68 and 69 encircling the push rods 63 and 64 respectively.

Extending upward from the cross bar or platform 56 and substantially in line with the uprights 12 and 13 are shaft brackets 70 and 71 which are bored as at 72 and 73 to rotatably receive a cam shaft 74. Mounted on the cam shaft 74 adjacent the brackets 70 and 71 are cams 75 and 76 respectively secured to the shaft 74 by set screws 77. The cams 75 and 76 are in the form of eccentrics engaging the heads 66 and 67 respectively. Mounted on the shaft 74 intermediate the cams 75 and 76 is a third cam 78 of the same form and similarly secured to the shaft 74 by a similar set screw 77. A handle 79 is mounted on the cam 78 to facilitate rotation of the cam 78 and the cam shaft 74 on which it is mounted, so as to rotate the cams 75 and 76 and depress the push rods 63 and 64 into engagement with the contact portions 39 of the clips or clamps 20 and 21 respectively.

In the operation of the invention, the operator selects a card 45 of the desired width and length corresponding to the amount of food S to be packaged, and mounts this in a form or support 48 with the edge 47 of the card in the groove 53. He then places this assembly 54 in the machine 10 by swinging the handle 79 to rotate the shaft 74 and depress the push rods 63 and 64 in order to open the jaws 34 and 35 of the clamps 20 and 21, as described above. In the machine as shown, only the upper jaw 34 is moved, the lower jaw 35 being fixedly secured to the shaft 19 or 18, as the case may be.

When the assembly 54 of the card 45 and support or form 48 has been mounted in the clamps or clips 20 and 21, the latter are closed by swinging the handle 79 in a reverse direction to rotate the shaft 74 reversely and permit the push rods 63 and 64 to be pushed upward by their springs 68 and 69, releasing the jaws 34 and permitting them to close upon the assembly 54 of the card 45 and support 48. The operator then hooks one end of the previously stuffed sausage S over the hook 44, and then grasps the handle 27 to rotate the crank 22 and shafts 18 and 19, winding the sausage S tightly upon the assembly 54 of the card 45 and support 48 (Figure 5). While the winding is proceeding, the assembly 54 will appear as in Figure 1 and not as in Figure 5, which shows the support 48 partially withdrawn from engagement with the card 45. As the sausage is wound tightly on the assembly 54, it forms the flat convolutions shown in Figures 5 and 6, these being kinked or indented at the opposite edges 46 and 49 of the card 45 and support 48 respectively, giving the appearance shown approximately in Figure 5.

When the required weight of sausage S has been wound on the assembly 54, the operator severs the wound-up sausage from the remainder thereof. The cam shaft 74 is then operated in the manner previously described to open the clamps or clips 20 and 21, permitting the operator to remove the assembly or packaged unit 80 of the card 45 and sausage S, together with the form or support 48. The operator then grasps the bent edge 51 of the latter and pulls it out of the assembly 80, leaving the assembly 80 to be covered with cellophane or other packaging material. This gives a very compact package which occupies the minimum space in a refrigerator. To prepare the sausage for eating, the cook unwinds the desired length of sausage, cuts it off and inserts it in a cooking pan. If desired, the sausage can be cooked in the short lengths established by the width of the card 45, the lengths being indicated by the kinks or indentations made in the sausage by the edges 46 of the card 45. A card about 6 inches long and 4 inches wide holds about one pound of sausage, but a greater or lesser amount can obviously be obtained by using a larger or smaller card, as the case may be.

The sausage, when packed in this manner, makes a neat-appearing package and is more sanitary because it requires less handling than sausage as ordinarily prepared. Since the package is covered with cellophane or similar material, and has been marked with the price and/or weight, it having been weighed after being removed from the machine, it is in a form especially well adapted for sale in a so-called supermarket where the customers wait on themselves. Moreover, the packaging of sausage in this manner is economical and sanitary and accordingly can be sold to the consumer at a lower price than conventional sausage.

To prepare a smaller quantity than the quantity shown in Figure 5, the operator selects a smaller card 45, for example a card adapted to hold a half-pound of sausage. The operator then loosens the set screws 26 and slides the shaft 19 and its clip or clamp 21 axially into the dotted line position of Figure 1. He then transfers the push rod 64 and its spring 69 to the dotted line positions with the rod 64 inserted in the bore 61 of the boss 58, removing the shaft 74 in order to do so. Since the machine is run for a considerable time on sausage packages of one weight, the time taken in converting the machine from one weight to another is not important. It will be obvious, however, that the upper ends of the brackets 70 and 71 can be made removable like pillow blocks of journal bearings, so that the shaft 74 can be lifted out easily without disturbing the cams 75, 76 and 78. The procedure in winding sausage upon a shorter card 45 is otherwise substantially the same as described above for the normal card 45.

What I claim is:

1. A packaged sausage product comprising a stiff approximately flat-sided card with approximately parallel opposite edges, and an elongated tubular membrane having a continuous uninterrupted chamber throughout its length containing sausage filling material tightly wound upon said card in a roughly spiral coil of elongated cross-section with relatively flat convolutions kinked at said opposite edges and with deep transversely-disposed grooved indentations therein, said opposite edges of said card projecting into said indentations.

2. A packaged sausage product comprising a stiff approximately flat-sided card with approximately parallel opposite edges, and an elongated tubular membrane having a continuous uninterrupted chamber throughout its length containing sausage filling material tightly wound upon said card in a roughly spiral coil of elongated cross-section with relatively flat convolutions kinked at said opposite edges at predetermined intervals therealong by the opposite edges of said card and with deep transversely-disposed grooved indentations therein, said opposite edges of said card projecting into said indentations.

3. A process of preparing a packaged sausage product comprising filling an elongated tubular membrane having a continuous uninterrupted chamber throughout its length with sausage filling material, tightly winding said filled tubular membrane in a roughly spiral coil upon a stiff approximately flat-sided card with approximately parallel opposite edges and simultaneously pulling said filled tubular membrane tightly against said opposite edges of said card to form deep transversely-disposed grooved indentations therein against said opposite edges of said card.

4. A process of preparing a packaged sausage product comprising filling an elongated tubular membrane having a continuous uninterrupted chamber throughout its length with sausage filling material, tightly winding said filled tubular membrane in a roughly spiral coil upon a stiff approximately flat-sided card with approximately parallel opposite edges in relatively flat convolutions of elongated cross-section and simultaneously pulling said filled tubular membrane tightly against said card edges to form deep transversely-disposed grooved indentations therein by kinking said filled tubular membrane against the opposite edges of said card.

5. A process of preparing a packaged sausage product comprising filling an elongated tubular membrane having a continuous uninterrupted chamber throughout its length with sausage filling material, tightly winding said filled tubular membrane in a roughly spiral coil upon a stiff approximately flat-sided card with approximately parallel opposite edges and with a reinforcing plate in face-to-face engagement therewith, simultaneously pulling said filled tubular membrane tightly against said opposite edges of said card to form deep transversely-disposed indentations therein against said opposite edges of said card, and slidably withdrawing said plate from engagement with said card while leaving said card with said filled tubular membrane thereon.

References Cited in the file of this patent

UNITED STATES PATENTS

| Number | Name | Date |
|---|---|---|
| 1,183,003 | Goldsmith | May 16, 1916 |
| 1,409,463 | O'Brien | Mar. 14, 1922 |
| 1,596,851 | Curry | Aug. 17, 1926 |
| 1,873,716 | Nickerson | Aug. 23, 1932 |
| 1,922,969 | MacCall | Aug. 15, 1933 |
| 1,988,058 | Traller | Jan. 5, 1935 |
| 2,003,862 | McKee | June 4, 1935 |
| 2,051,922 | Vogt | Aug. 25, 1936 |
| 2,103,339 | Salfisberg | Dec. 28, 1937 |
| 2,161,071 | McGrath et al. | June 6, 1939 |
| 2,344,862 | Funke | Mar. 21, 1944 |
| 2,353,746 | Moore | July 18, 1944 |
| 2,555,585 | Fairbank | June 5, 1951 |
| 2,646,357 | Seiferth | July 21, 1953 |